United States Patent [19]

Karbowski et al.

[11] Patent Number: 4,906,973
[45] Date of Patent: Mar. 6, 1990

[54] WALK-THROUGH METAL DETECTOR

[75] Inventors: James P. Karbowski, Philomath; Mark W. Rohde, Scio, both of Oreg.

[73] Assignee: White's Electronics, Inc., Sweet Home, Oreg.

[21] Appl. No.: 188,269

[22] Filed: Apr. 29, 1988

[51] Int. Cl.$^4$ ............................................. G08B 13/24
[52] U.S. Cl. ................................... 340/551; 340/568; 324/233; 324/243
[58] Field of Search ....................... 340/551, 572, 568; 324/326, 233, 239, 329, 243

[56] References Cited

U.S. PATENT DOCUMENTS

| | | | |
|---|---|---|---|
| 3,758,849 | 9/1973 | Susman et al. | 340/551 |
| 3,950,696 | 4/1976 | Miller et al. | 340/568 |
| 4,012,690 | 3/1977 | Heytow | 324/343 |
| 4,249,128 | 2/1981 | Karbowski | 324/329 |
| 4,325,027 | 4/1982 | Dykstra et al. | 324/329 |
| 4,357,535 | 11/1982 | Haas | 378/57 |
| 4,470,015 | 9/1984 | Hirschi et al. | 324/233 |
| 4,507,612 | 3/1985 | Payne | 324/329 |
| 4,605,898 | 8/1986 | Aittoniemi et al. | 340/551 |

FOREIGN PATENT DOCUMENTS 0208214 1/1987 European Pat. Off.

Primary Examiner—Joseph A. Orsino
Assistant Examiner—Jill D. Jackson
Attorney, Agent, or Firm—Chernoff, Vilhauer, McClung & Stenzel

[57] ABSTRACT

A walk-through metal detector comprising an array module supporting transmit and receive coil arrays. Surrounding the array module, yet not touching it, is an outer shell protecting the array module from contact. A passageway tube passes through the opening in the array module, and is supported by the outer shell, further isolating the array module from mechanical vibration. The array module has a relatively high resonant frequency; thus, vibration induced signals are higher in frequency than actual target signals and are disregarded by the detection circuitry. The metal detector also includes a bypass chute, mechanically isolated from the array module, in which metallic objects may be placed and transported to the exit of the passageway without setting any alarms. The array module supports a balanced transmit and receive coil array for insensitivity to external electromagnetic interference. Alternate coil configurations may be selected by the operator to reduce the detector's sensitivity at predetermined portions of the passageway. The detection circuitry of the metal detector includes quadrature phase demodulators for separating target signals into components caused by eddy currents and by permeability changes. The detection circuitry looks for permeability changes only when detected eddy currents indicate a person is within the passageway. A small target detection circuit watches for metal only when the person is centered within the passageway. A large target detection circuit with less sensitivity detects quantities of metal that overload the small target detection circuit.

12 Claims, 8 Drawing Sheets

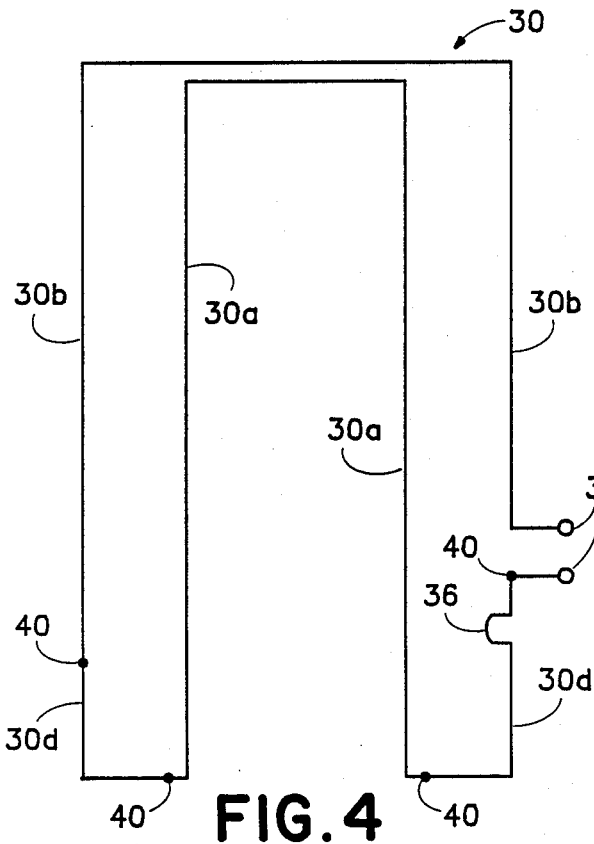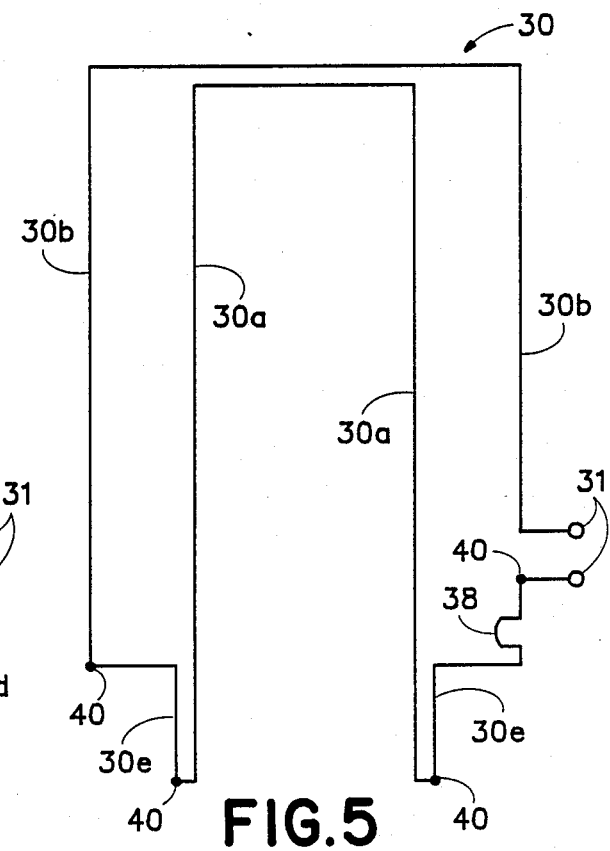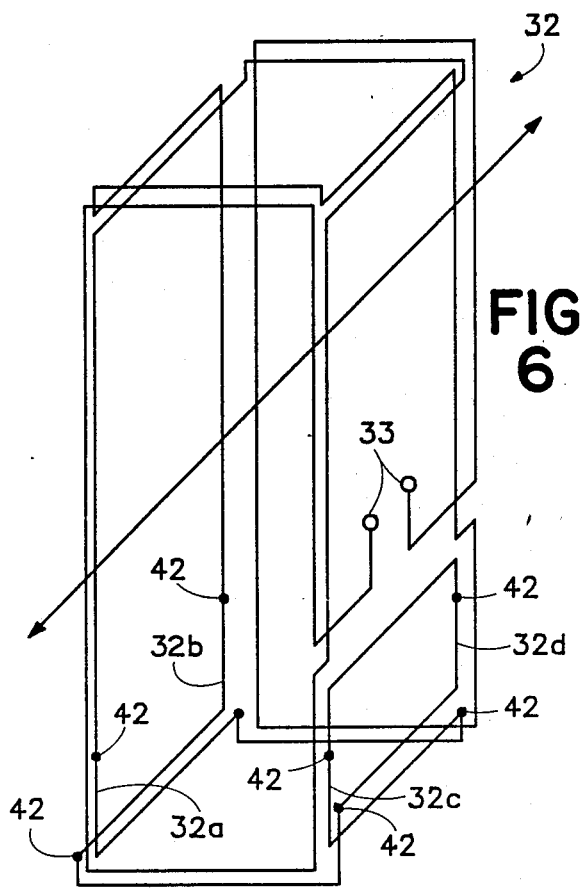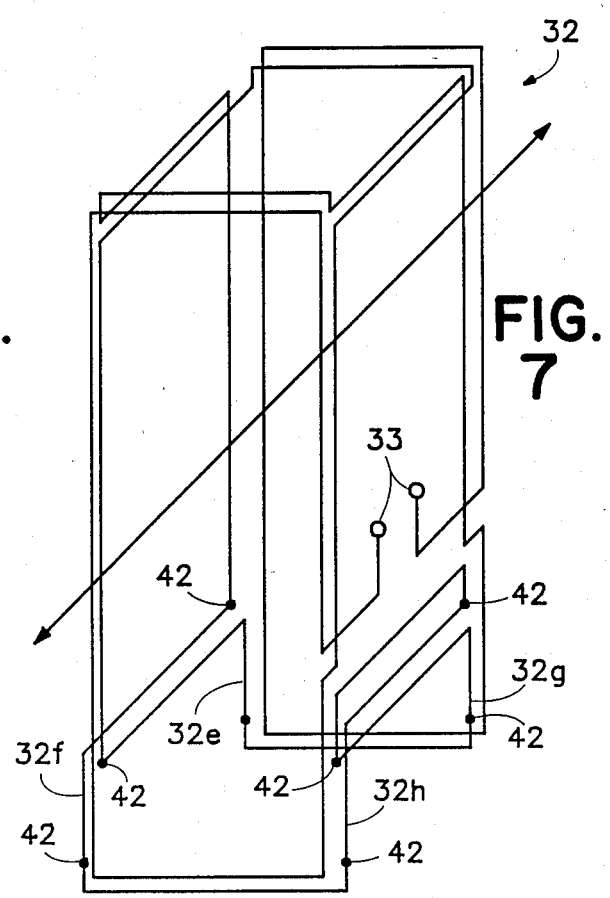

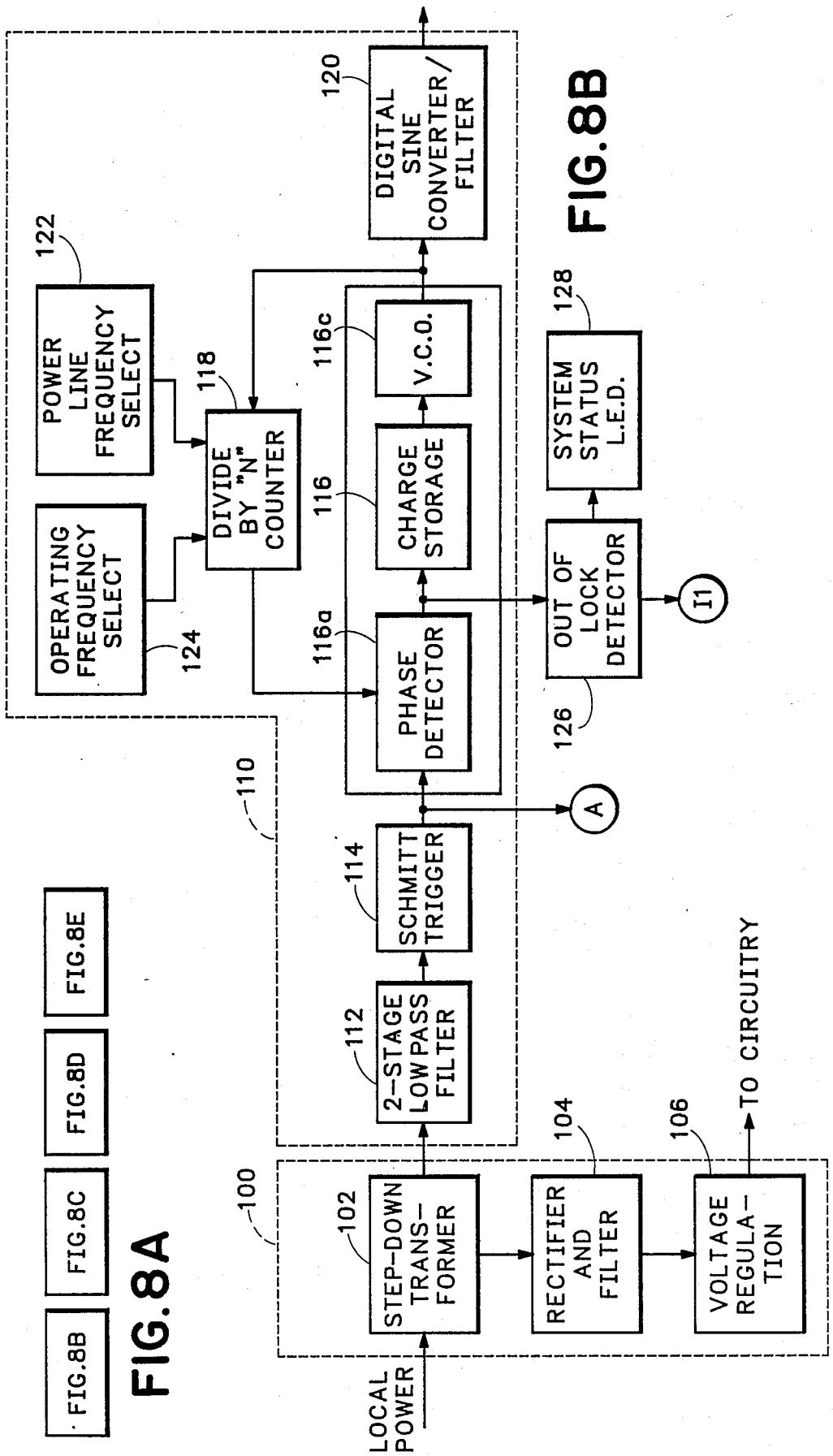

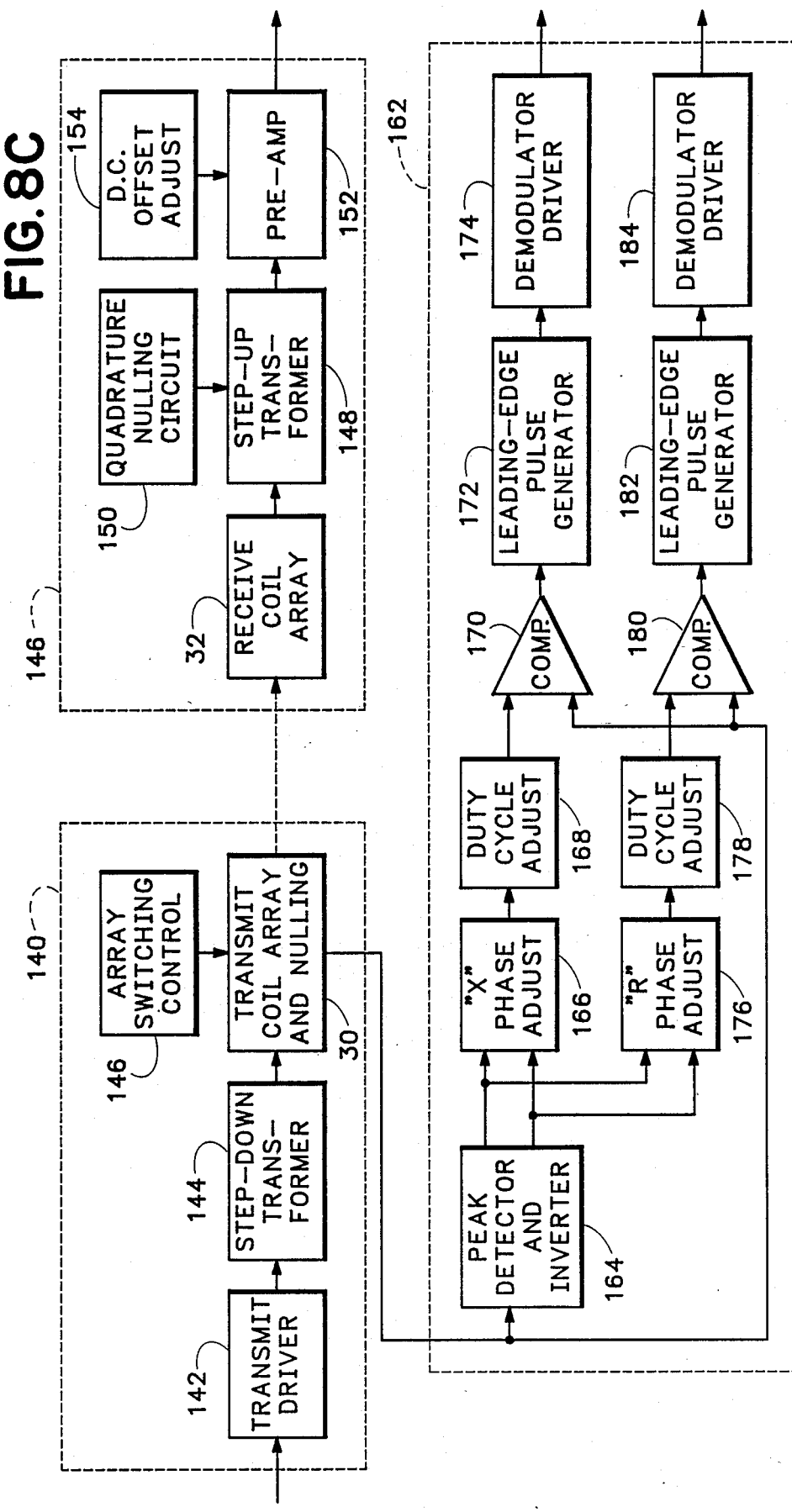

WALK-THROUGH METAL DETECTOR

BACKGROUND OF THE INVENTION

The present invention pertains to the field of walk-through metal detectors. Such metal detectors are not new; virtually anyone who has traveled by commercial air recently has seen a walk-through security metal detector in use. Typical walk-through metal detectors, however, are designed with relatively low sensitivity. Keys, watches, jewelry, buttons, zippers, and the like generally do not contain much metal while guns, knives and similar weapons do. To avoid having airline passengers remove jewelry, keys, and clothing, security metal detectors need only be sensitive enough to detect the amounts of metal in weapons. Such metal detectors are not usable to detect minute amounts of metal, such as is contained in integrated circuit chips.

One form of walk-through type metal detector is shown in Haas U.S. Pat. No. 4,357,535. Haas, however, describes an arch that is susceptible to being bumped, producing vibrations which in turn can cause spurious signals in the detector system due to its high sensitivity.

A coil configuration for a walk-through metal detector is shown in Aittoniemi, et al. U.S. Pat. No. 4,605,898 which is intended to minimize the role of target orientation in detection. A balanced coil configuration is described in Goring Kerr Limited European Patent Application Publication No. 0 208 214. Neither Aittoniemi et al. nor Kerr, however, show means to decrease sensitivity through a predetermined section of the passageway.

The use of a high sensitivity metal detector also poses difficulty due to the presence of metal in the environment surrounding the metal detector. For example, there may be metal reinforcing bars in the floor or metal objects or machinery located near the detector.

SUMMARY OF THE INVENTION

In an exemplary embodiment, a walk-through type of metal detector according to the present invention comprises a array module which supports the transmit and receive coil arrays. Surrounding the array module, yet not touching it, is an outer shell which protects the array module from being bumped. A passageway tube, large enough for an erect person to walk through, extends through a opening in the array module, and is supported by the outer shell, further isolating the array module from mechanical vibration.

The array module has a relatively high resonant frequency. Thus, vibration induced signals are caused to be higher in frequency than actual target signals, enabling the detection circuitry to disregard them.

The metal detector also includes a bypass chute, mechanically isolated from the array module, in which metallic objects may be placed and transported to the exit of the passageway without setting out an alarm.

The array module supports a transmit and receive coil array which is balanced so as to be insensitive to external electromagnetic interference. Alternate coil configurations may be selected by the operator to reduce the detector's sensitivity at predetermined portions of the passageway.

The detection circuitry of the metal detector includes quadrature phase demodulators for separating target signals into components caused by eddy currents and by permeability changes. The detection circuitry responds to permeability changes only at times when detected eddy currents indicate that a person is within the passageway. A small target detection circuit responds to the presence of metal only when the person passing through is centered within the passageway. A large target detection circuit with less sensitivity responds to the presence of large quantities of metal that would overload the small target detection circuit.

It is a primary object of the present invention to provide a walk-through type of metal detector which is capable of reliably detecting small amounts of both ferrous and nonferrous metal passing through a large aperture.

It is another object to provide a mechanical structure for supporting a walk-through type metal detector wherein the coil array for generating and responding to the electromagnetic field used in the metal detector is isolated from mechanical vibrations induced by persons passing through or nearby the structure.

It is another object, in a walk-through metal detector of the type described, to provide means for converting any residual mechanical vibration components induced in the support structure for the metal detector to a frequency above the normal detection passband of the detector.

It walk-through metal detector of the type described that yields simple target responses while retaining desirable features such as ease of construction, resistance to vibration, adaptability to various configurations, insensitive to target spatial orientation while maintaining target sensitivity, and insensitivity to relatively large amounts of metallic objects outside the active area.

It is another object to provide, in a walk-through type metal detector, an electronic means to eliminate false responses caused by mechanical vibrations in the detector support structure and floor.

It is a another object to provide in a walk-through type metal detector means for detecting target metal while discriminating against body response.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 4 is a schematic elevational view of the transmit coils of said detector when configured for sensitivity throughout the passageway.

FIG. 5 is a schematic elevational view of the transmit coil array of said detector when configured for insensitivity at the lower section of the passageway.

FIG. 6 is a schematic perspective view of the receive coil array of said detector when configured for sensitivity throughout the passageway.

FIG. 7 is a schematic perspective view of the receive coil array of said detector when configured for insensitivity at the lower portion of the passageway.

FIGS. 8B–8E, when arranged as shown in FIG. 8A, form a block diagram of the circuitry of said detector.

DESCRIPTION OF THE PREFERRED EMBODIMENT

Figure 1:
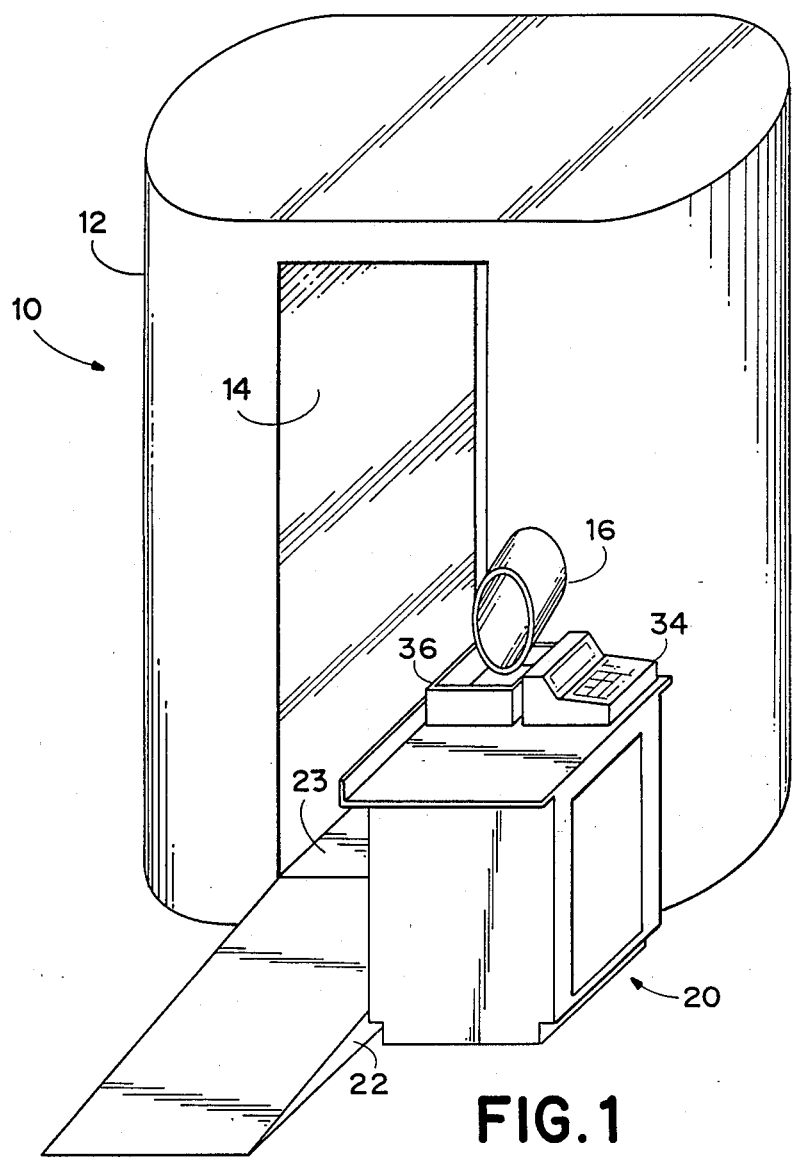
FIG. 1 is a perspective view of an illustrative embodiment of a walk-through metal detector according to the present invention.

A walk-through metal detector 10 according to the present invention is shown in FIG. 1. The major structural components of the detector 10 are an outer shell 12, a passageway 14, an array avoidance chute 16, an array module 18 within the outer shell and shown in FIGS. 2 and 3, and a control station 20. A ramp 22 may also be present, if desired.

The metal detector's active area, or area of detection, is primarily concentrated within the passageway 14. A person to be searched for metal walks through the passageway 14, in either direction. Known metallic objects, such as keys and eyeglasses, can be passed through the array avoidance chute 16, landing in a catch tray 36, without activating any alarms. A rubber pad may line the bottom of the catch tray 36 to prevent fragile objects, such as eyeglasses, from breaking. An operator stands or sits behind the control station 20, which supports a terminal 34, provides storage, and contains the detector's power supply.

Figure 2:
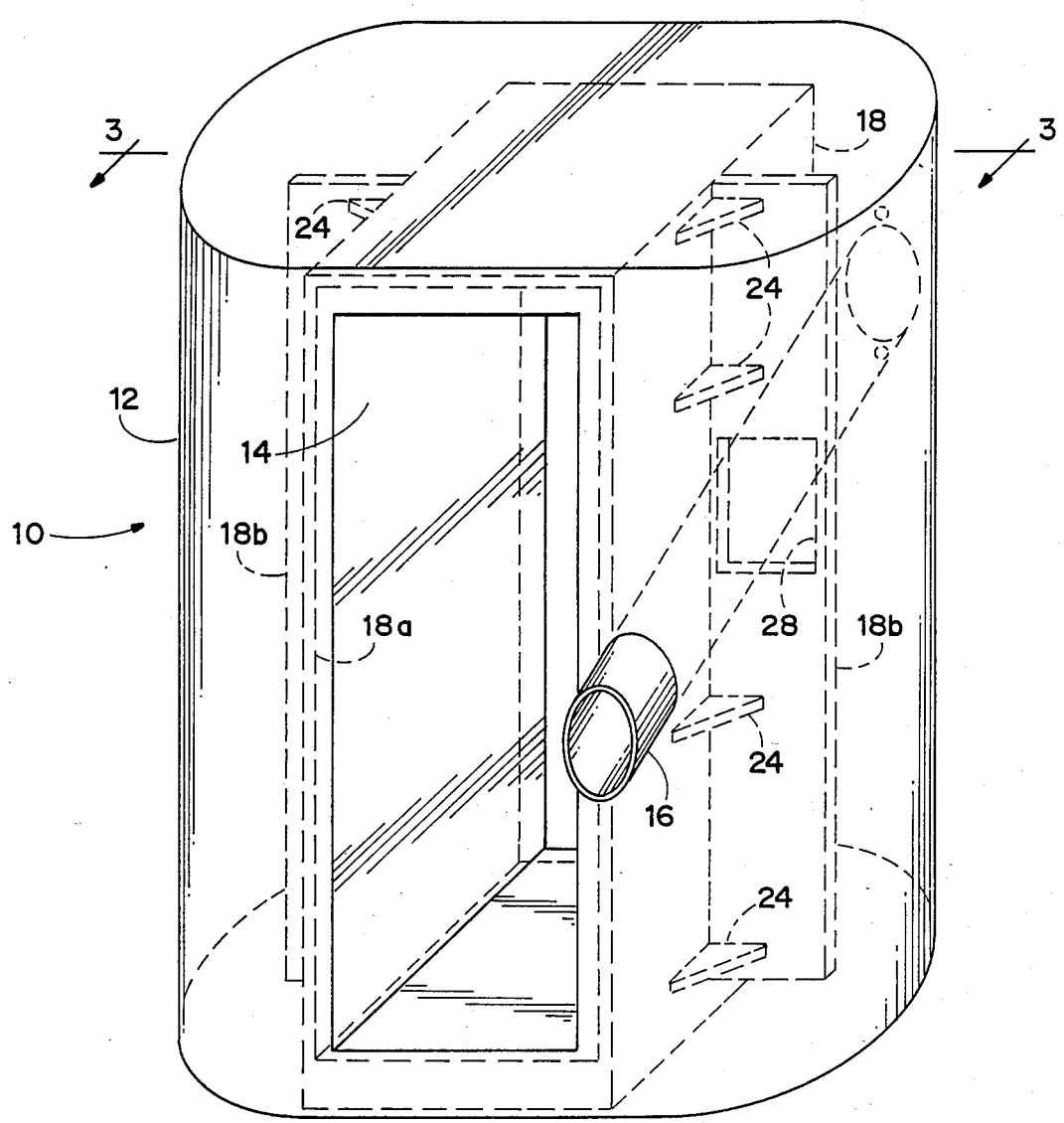
FIG. 2 is a perspective view of said detector with selected internal features shown as dashed lines.

The configuration of the array avoidance chute 16 is more clearly shown in FIG. 2. The chute 16, being inclined downward, gravity causes objects deposited thereon to slide. Preferably, a low-friction coating is applied within the chute 16 to prevent objects from slowing to a stop therewithin.

Figure 3:
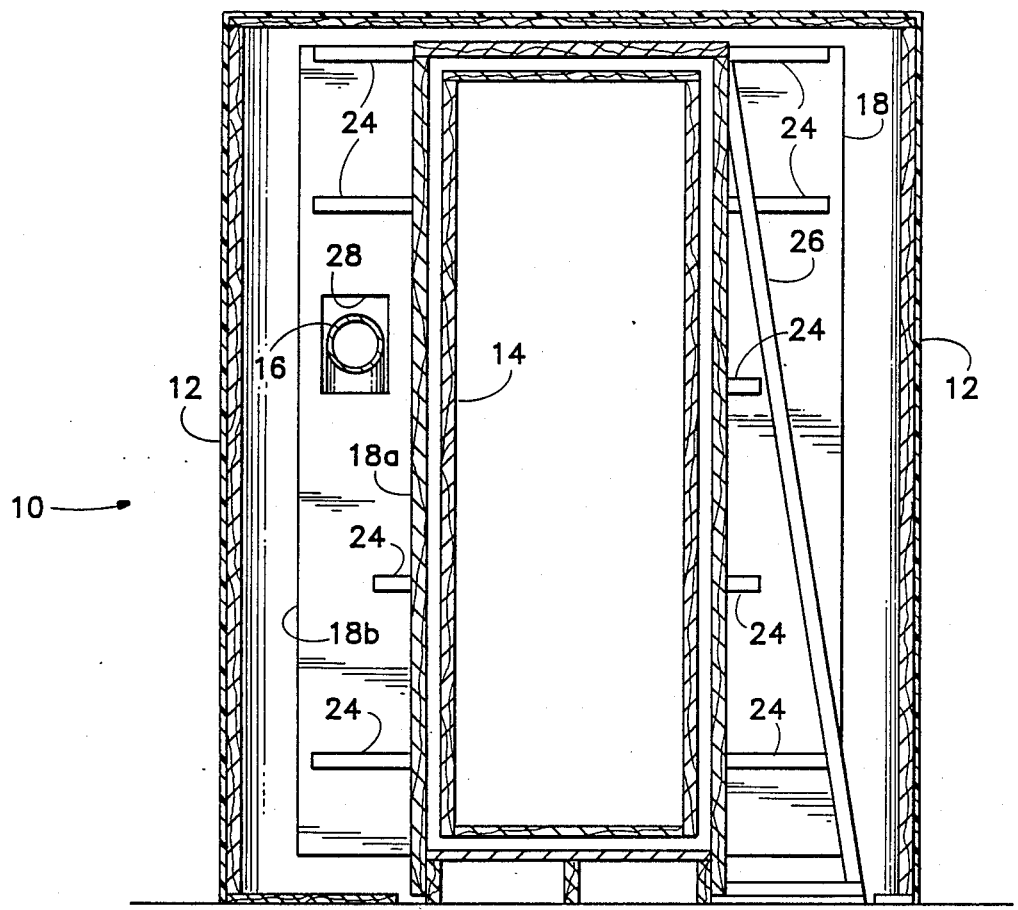
FIG. 3 is sectional view of said detector taken along line 3—3 of FIG. 2.

Referring now to FIGS. 2 and 3, the array module 18 is hidden within the outer shell 12, and comprises a tunnel-like section 18a and two side panels 18b. The side panels 18b are supported perpendicular to the tunnel-like section by braces 24. The array module is also stabilized by two frame stabilizers 26. (The second frame stabilizer 26 is hidden from view behind a side panel 18b in FIG. 3.) The array module supports a transmit coil array 30 and a receive coil array 32, shown in perspective schematic form in FIGS. 4-7. Due to the metal detector's high sensitivity, any slight variation of the relative positions of the transmit and receive coil array can induce false target signals. These slight variations can be caused by the array module being bumped or jarred.

To prevent such false signals, the array module 18 is sheltered from contact. The module and the outer shell 12 are first secured to the floor with bolts, preventing them from shifting. The passageway 14 is inserted through the opening in the array module and is supported entirely at both ends by the outer shell. Neither the outer shell nor the passageway contact the array module. With the outer shell and passageway being mechanically isolated from the array module, a person can walk through the detector or bump the outer shell without directly causing contacting the array module. A resilient mat preferably is placed on the floor 23 of the passageway to further absorb vibrations. The array avoidance chute 16 also passes through an opening 28 in the side panel 18b and is supported at both ends by the outer shell, thereby mechanically isolating the chute from the array module.

Since the array module 18 is firmly attached to the floor, anything that causes the floor to move also causes the module to move. Vibrating heavy machinery, or even a person walking near the detector, can cause the module to move responsively. Such vibrations can similarly also cause the outer shell and passageway to vibrate. Since the metal detector is intended for industrial environments, it is designed to tolerate such vibrations. Furthermore, acoustic coupling between the outer shell and the array module can cause the array module to vibrate when the outer shell moves.

The frequency of induced false signals caused by flexing of the array module 18 is primarily the frequency at which it vibrates. By designing the module to resonate at a relatively high frequency, the vibration-induced signals have a higher frequency than those signals caused by actual targets. The array module is constructed using wood and extruded polystyrene foam insulation. As an added advantage, vibrations in the light structure are more easily damped. The two frame stabilizers 26 raise the resonant frequency of the array module to about 50 Hertz and damp vibrations. The detection circuitry, discussed in more detail later, filters out frequency components of signals greater than about 12 Hz. Thus, most signals caused by vibration of the array module 18 are ignored by the target detection circuitry.

Although the arrangements of the transmit coil array 30 and receive coil array 32, to be discussed in more detail later, concentrate sensitivity within the passageway 14, some sensitivity extends to the exterior of the metal detector. To allow the detector to be used near stationary metal, for example, reinforcing bar in a concrete floor, pipes or even machinery, the detector is made sensitive only to moving metal. The circuitry responsible for this will be discussed in more detail later. Since a vibrating floor can also cause the outer shell 12 to vibrate, any metal in the shell would also move, and thus be detected. Consequently, the outer shell 12, the passageway 14, and the array avoidance chute 16 are preferably constructed entirely from wood, formica, and other nonmetallic materials and attached to the outer shell using nonmetallic nylon fasteners.

FIGS. 4-7 show user selectable alternate configurations of the transmit coil array 30 and the receive coil array 32. One feature of the present invention is to allow the sensitivity of the detector to be greatly decreased at a predetermined range of heights within the passageway 14. In the described embodiment, the metal detector can be made insensitive to metal passing through a lower portion of the passageway by selecting the transmit coil array configuration shown in FIG. 5 and the receive coil array configuration shown in FIG. 7. One skilled in the art will appreciate that the invention is not necessarily so limited and that a metal detector according to the present invention could be made which is insensitive to metal at various ranges of heights. For example, a metal detector can be built with a plurality of contiguous insensitive ranges which could be switched in or out to establish the height of any detected metal.

FIGS. 4 and 5 show user selectable alternate array geometries for the transmit coil array 30. The transmit coil array is supported by the side panels 18b of the array module 18 and is in the plane which perpendicularly bisects the center of the passageway 14. An inner loop 30a and an outer loop 30b are serially connected, thus carrying identical currents and causing opposing magnetic fields of equal magnitude. When the inner and outer loops are separated by a horizontal distance, as shown in FIG. 4, their magnetic fields do not cancel. In FIG. 5, the inner loop 30a and a lower portion 30e of the outer loop 30b are adjacent; their equal magnitude, opposing magnetic fields sum to zero.

Both configurations of transmit coil arrays 30 are present in the detector 10. The desired configuration is selected using a switch 146 on the terminal 34, and shown in FIG. 8C, which activates transmit array relays 40. The transmit array relays 40 interchange coil portions 30d with coil portions 30e. Other means of switching between coil configurations are possible. Entire coil arrays may be exchanged, or as shown, merely their differing portions.

Both configurations of the transmit coil array 30 include separate nulling coils 36 and 38. These nulling coils are adjusted, by bending them out of the plane either one direction or the other, at the site to minimize transmitted energy detected by the receive coil array 32. These nulling coils 36 and 38 allow the unbalancing effects of nearby stationary metal to be cancelled.

In neither configuration does the inner loop 30a or the outer loop 30b completely encircle the passageway 14, thereby minimizing the horizontal portions of the transmit loop which are near the floor and susceptible to magnetic coupling with any metal therein.

FIGS. 6 and 7 show the user selectable alternate array geometries of the receive coil array 32. The receive coil array is supported by the tunnel-like section 18a of the array module 18, with the receive coil loops positioned at both entrances to the passageway 14. The receive coil array is arranged in a balanced configuration, that is, it has an equal and opposing receive geometry on each side of the transmit coil array 30. Thus, external electromagnetic interferences that induce voltages in one side of the receive coil array will also induce opposing voltages in the other side. If the strength of an external interference is nearly the same at both sides, as is generally the case, the induced opposing voltages will also be nearly the same and cancel each other. Likewise, signals induced in the receive coil array by the transmit coil array also will cancel. Only when conductive material alters the normally balanced magnetic field does the receive coil array produce a net signal at its terminals 33.

Where sensitivity to metal is desired, the loops of the receive coil array 32 are arranged so their induced voltages support each other, as shown in FIG. 6. Where insensitivity to metal is desired, the loops of the receive coil array are arranged so their induced voltages cancel each other. Since the opposite sides of the balanced receive coil array normally produce voltages that oppose each other, trading positions of lengths of the loops causes the signals to cancel. Thus, in FIG. 7, where insensitivity is desired at the lower portion of the passageway 14, the loop segments 32a, 32b, 32c, and 32d of FIG. 6 are substituted for loop segments 32e, 32f, 32g and 32h, respectively.

Looking at this in another way, around each end of the passageway 14 are two coils of the receive coil array 32. In FIG. 6, these coils are wound in the same direction; thus voltages induced in the two coils will add. The upper portion of the receive coil array in FIG. 7 matches that of FIG. 6, but in the lower portion, however, the two coils are wound in opposite directions; thus, voltages respectively induced therein will cancel.

The array switching control on the terminal 34 which selects the active transmit array configuration also actuates receive array relays 42 to change the geometries of the receive coil array 32.

Figure 8D:
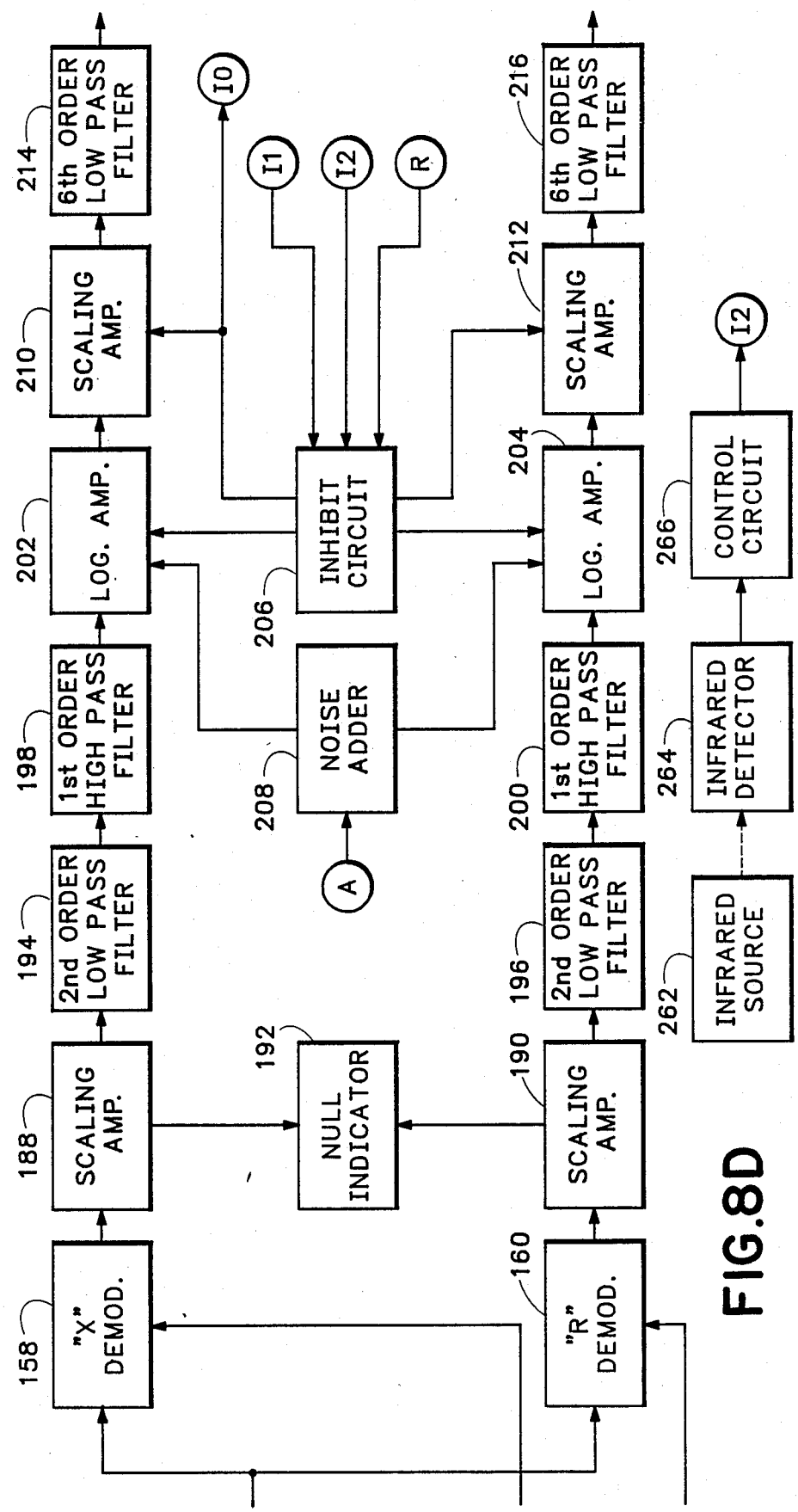

FIGS. 8B-8E, when arranged as shown in FIG. 8A, form a block diagram of the walk-through metal detector's circuitry. Referring initially to FIG. 8B, the system power supply 100 includes a stepdown transformer 102 whose primary is coupled to local power at exemplarily 120 or 240 volts AC, at 50-60 hertz. The secondary winding of the power transformer 102 is connected to a combined rectifier and filter circuit 104 which in turn is connected to a voltage regulating circuitry 106. The output terminals of the voltage regulating circuitry exemplarily provide plus and minus 7.5 volts DC to the metal detector's circuitry.

A frequency synthesizer 110 is connected to another secondary winding of the power transformer 102. The input sinusoidal wave-form is filtered through a 2-stage low-pass filter 112 and input to a Schmitt trigger 114 which produces as an output a clean, jitter-free, square wave, with one pulse per power line transition, from a potentially extremely noisy local power line. (The output from the Schmitt trigger 114 is also connected to a noise adder circuit 208, shown on FIG. 8D, and to be described later.)

A phase-lock loop 116 and a programmable divide-by-"n" counter 118 cooperate to produce a square wave signal of frequency ten times the system operating frequency (i.e. the frequency of the signal applied to the terminals 31 of the transmit coil array 30). The square wave signal, which is the signal output from a voltage controlled oscillator 116c of the phase lock loop 116, is input to a digital sine converter and filter circuit 120, which converts the square wave to a pseudo sinewave. The digital sine converter 120 is a five-stage walking ring converter, its output signal having one-tenth the frequency of its input signal, thus outputting a sinewave signal at the operating system frequency.

Low frequency beat frequencies could potentially cause false alarms. To minimize this problem, the center frequency of the phase-lock loop 116 is selected to be a half-multiple (i.e. a multiple of one-half) of the local power line's frequency. Consequently, the only beat frequencies produced are also close to half-multiples of the power line frequency. As will be described later, subsequent processing electronics eliminates signals having spectral energy above 12 hertz, thus eliminating multiples of 25 or 30 hertz.

The divide-by-"n" counter 118 is programmable, allowing the detector to operate at a variety of system frequencies. The actual range of "N" is 2505-2595 or 3105-3195 for 60 or 50 Hz power line frequencies, respectively. Accounting for the frequency division of the digital sine converter 120, the operating system frequency may be one of the 250.5th through 259.5th multiples for 60 Hz power, or one of the 310.5th through 319.5th multiples for 50 Hz power. The choice of system frequency is made by setting a DIP switch, shown on the block diagram as "operating frequency select" 124. The choice between 50 and 60 Hz power line frequencies is made by a jumper and shown as power line frequency select 122 on the block diagram, which presets the two most-significant digits of "N" for the counter 118.

When the phase locked loop 116 is locked, the phase detector 116a produces very narrow negative signal pulses for the charge storage capacitor 116b. An out-of-lock detector circuit 126 is also connected to the output terminal of the phase detector 116a and averages this pulse output, resulting in a voltage related to the "quality" of the lock at any given time. When this average voltage represents an out-of-lock situation, the out-of-lock-detector circuit 126 illuminates a red "system status" light-emitting diode 128 on the terminal 34.

The output terminal of the digital sine converter and filter circuit 120 is connected to the transmit coil circuitry shown in FIG. 8C. The transmit coil circuitry 140 includes a transmit array coil driver 142 connected to a the transmit coil array 30 via a step-down transformer 144.

As previously discussed, the lower portion of the passageway 14 can be made relatively insensitive by using relays 40 and 42 to switch the configuration of the transmit and receive coil arrays 30 and 32, thus reducing sensitivity both to targets passing through this lower area and to vibration responses induced by fixed metal in or near the floor.

The receive coil circuitry 146 includes the receive coil array 32 which is connected to a preamplifier 152 via a step-up transformer 148. The transmit coil array 30 is nulled by adjusting the nulling coils 36 and 38 to minimize the voltage at receive array terminals 33 when no moving metal is near the detector. However, large metal objects near the detector can cause such voltages. These unwanted signals are primarily produced by transmitter induced eddy currents flowing in any conductive objects located near (i.e. closer than about 24 inches) the detector 10. A quadrature nulling circuit 150 is connected to a third winding of the step-up transformer 148, and produces a signal in quadrature with the signal from the transmit driver 142, thereby cancelling any conductive component contained in the signal produced by the receive coil array 32. The amplitude of this nulling signal is adjustable over a range suitable to allow the detector to be positioned near to fairly large amounts of metallic material, such as the reinforcing material contained in the concrete support floor, and still operate satisfactorily for its intended purpose.

The secondary winding of the step-up transformer 148 is connected to the input of a balanced IC differential preamplifier 152, whose output, typically, includes a component caused by input offsets. An offset correction signal voltage, equal to this offset component, is produced by a DC offset adjust circuit 154 and input to the inverting input terminals of both sides of the balanced preamplifier 152. The resulting offset components contained in the signal output from preamplifier 152 (hereinafter referred to as the "composite receive signal") are equal in amplitude and opposite in polarity, and thus cancelled by the balanced synchronous demodulators 158 and 160 that follow.

The output of the preamplifier 152 is to the input of two commutating CMOS solid state switches, shown in FIG. 8D, which function as an "X" demodulator 158 and an "R" demodulator 160. The demodulators 158 and 160 each receive a switching control signal at the system frequency, but shifted in phase. The phase relationship is predetermined so as to provide selective full wave rectification of the components that make up the composite receive signal. The "X" demodulator 158 receives a switching signal substantially in phase with the signal of the transmit coil circuitry 140. Thus the switching action occurs at the zero crossing of the "permeable," "in phase," or "X" component contained in the composite receive signal. The "R" demodulator 160 receives a switching signal in quadrature with that received by the "X" demodulator 158.

Most frequency components not related to the system operating frequency or its harmonics will average out and not affect the output of the demodulator 158 and 160. Noise signals with frequencies fairly close to the system operating frequency are the exception and will produce beat frequencies at the demodulators' outputs. These components are removed by subsequent filtering circuitry.

The demodulators 158 and 160 both receive their reference switching control signals from a switching signal circuit 162, shown in FIG. 8C. Since the system frequency is determined by both the frequency of the local power and the setting of the operating frequency select circuitry 124, the switching signal circuit 162 is designed to operate independently of system frequency and magnitude variations. A peak detect circuit 164 in the switching signal circuitry 162 receives a system frequency reference signal from the transmit coil array 30 and supplies as its outputs a positive polarity "positive peak" DC signal and a negative polarity "negative peak" DC signal, where both signals having voltage magnitudes equal to the peak voltage of the system frequency reference signal. Both of these peak DC voltages are supplied as inputs to an "X" phase adjust circuit 166. The "X" phase adjust circuit 166 comprises a variable resistor and supplies at its output a DC voltage of predetermined relationship to the voltages of the positive peak and negative peak signals. For example, the "X" phase adjust circuit 166 can supply a signal whose voltage is always one-half the voltage of the positive peak signal, regardless of voltage or frequency variations in the positive peak signal. An "X" duty adjust circuit 168 adds a DC offset signal to the output of the "X" phase adjust circuit 166 and supplies the resulting signal to an input terminal of a "X" comparator 170. Another input terminal of the "X" comparator receives the system frequency reference signal from the transmit coil array 30. At the output terminal of the "X" comparator 170 is an "X" switching signal having a predetermined phase relationship to the system frequency reference signal. The "X" switching signal is further altered by an "X" leading edge pulse generator circuit 172 and an "X" demodulator driver 174, resulting in a square wave signal having a 50 percent duty cycle. This signal output from the "X" demodulator driver 174 is connected to the control input of the CMOS switch of the "X" demodulator 158.

Similarly, an "R" phase adjust circuit 176 also receives the positive peak and negative peak signals from the peak detector circuit 164. Following the "R" phase adjust circuit 176 are an "R" duty cycle adjust circuit 178, an "R" comparator 180, and "R" leading-edge pulse generator 182, and an "R" demodulator driver 184 which operate in the same manner as the just-described "X" circuits. The "R" demodulator driver 184 also supplies a 50 percent duty cycle square wave switching control signal to the control input of the CMOS switch of the "R" demodulator 160.

The output signals of the demodulators 158 and 160 are DC voltages proportional to the components of the composite received signal which are both at the system operating frequency and are in phase with the switching signals from the switching signal circuitry 162. The outputs of the demodulators 158 and 160 are connected as inputs to the "X" and "R" scaling amplifiers 188 and 190, respectively.

The respective outputs of the "X" and "R" scaling amplifiers 188 and 190 can be connected to an external null indicator 192, allowing measurement of any null error components of each channel. The "X" null error components are monitored when adjusting the nulling coils 36 and 38, shown in FIGS. 4 and 5, while the "R" null error components are monitored when adjusting the output of the quadrature nulling circuit 150.

As can be seen from FIG. 8D, many of the "X" and "R" circuitry components are virtually identical and thus only the "X" components will be described in detail. The output of the "X" scaling amplifier 188 is connected to an "X" second-order low-pass filter 194 which has a 3 dB corner of 12 Hz. The output of the "X" second-order low-pass filter 194 in turn is capacitively coupled to the input of an "X" logarithmic amplifier 202. The capacitive coupling forms a first-order high-pass filter 198 having a 3 dB corner of 0.25 Hz, which is responsible for removing relatively steady signal components in the composite receive signal, such as can be caused by operational amplifier drift and normal system temperature variation.

The "X" and "R" logarithmic amplifiers 202 and 204 each comprise thirteen stages of non-inverting IC operational amplifiers connected in series. Each stage has a voltage gain of 5 dB with the combined gain of the complete amplifier being 70 dB. The output stages successively limit, or saturate, as the input signal level is increased, up to a point where all the stages are saturated, which is the upper limit of the total system dynamic range. The output of the "X" logarithmic amplifier 202 is connected to a second "X" scaling amplifier 210.

A noise adder circuit 208, which also receives an output signal from the Schmitt trigger 114 (FIG. 8B), supplies as its output a noise signal having the same frequency as its input signal, but with adjustable amplitude. The output of the noise adder circuit 208 is connected to the inputs of both the "X" and "R" logarithmic amplifiers and amplitude of the noise signal is adjusted so that the last two stages of each logarithmic amplifiers 202 and 204 are saturated. External impulse noise interference has less effect on a logarithmic amplifier when the last two stages are saturated at one rail or the other. A target signal, having a much lower frequency, causes a net change in the average output of the logarithmic amplifier. This technique raises the overall system signal-to-noise ratio by approximately 10 dB.

An inhibit circuit 206 receives the outputs of the out-of-lock detector 126, a control circuit 266, and the reset output of an alarm logic circuit 236. When the inhibit circuit 206 receives a signal from any one or more of these three sources, it places an "inhibit control" signal at its output terminal, which in turn is received by the "X" and "R" logarithmic amplifiers 202 and 204. In response, the time constant of the capacitive coupling filter 198 is drastically increased, effectively lowering the gain. The inhibit control signal also causes the gain of the "X" and "R" scaling amplifiers 210 and 212 to decrease. Overall, the effective gains are reduced by a factor of approximately four orders of magnitude. Finally, the inhibit control signal also acts as a command for a control circuit 268, which will be discussed later. The effect of the inhibit circuit is to prevent false alarms caused by switching transients, which in turn are caused by an actual alarm condition. Due to time delays inherent in the detection circuitry, such a false alarm would occur approximately 2 seconds after the true alarm, which is after the person has left the passageway. Since such false alarms can decrease confidence in the detector, they are prevented. The inhibit control signal is active when the phase lock detector circuit 126 is not locked, when an object is detected in the array avoidance chute 16, and when the detector 10 receives a reset command.

An infrared light source 262 and an infrared light detector 264 are located at the upper end of the array avoidance chute 16, positioned such that an object placed in the chute will prevent the light detector from receive infrared light from the infrared light source. The output of the detector 264 is connected to the input of the control circuit 266 which sends a control signal to the inhibit circuitry 206 whenever an object blocks the path of light between the light source 262 and the detector. This control signal lasts for about two seconds and starts after the light beam has been reestablished.

The output of the "X" scaling amplifier 210 is connected as an input to a sixth-order low-pass filter 214. The four low-pass filters, shown in FIG. 8D as "X" and "R" second-order low-pass filters 188 and 190 and as "X" and "R" sixth-order low-pass filters 214 and 216, are responsible for removing signal frequency components in the composite receive signal greater than about 12 hertz. Since it has been found that actual target signals generally have a maximum frequency component of under 3 hertz for a person walking through the passageway, and under 8 hertz for a person rushing through, no wanted information is lost.

Figure 8E:
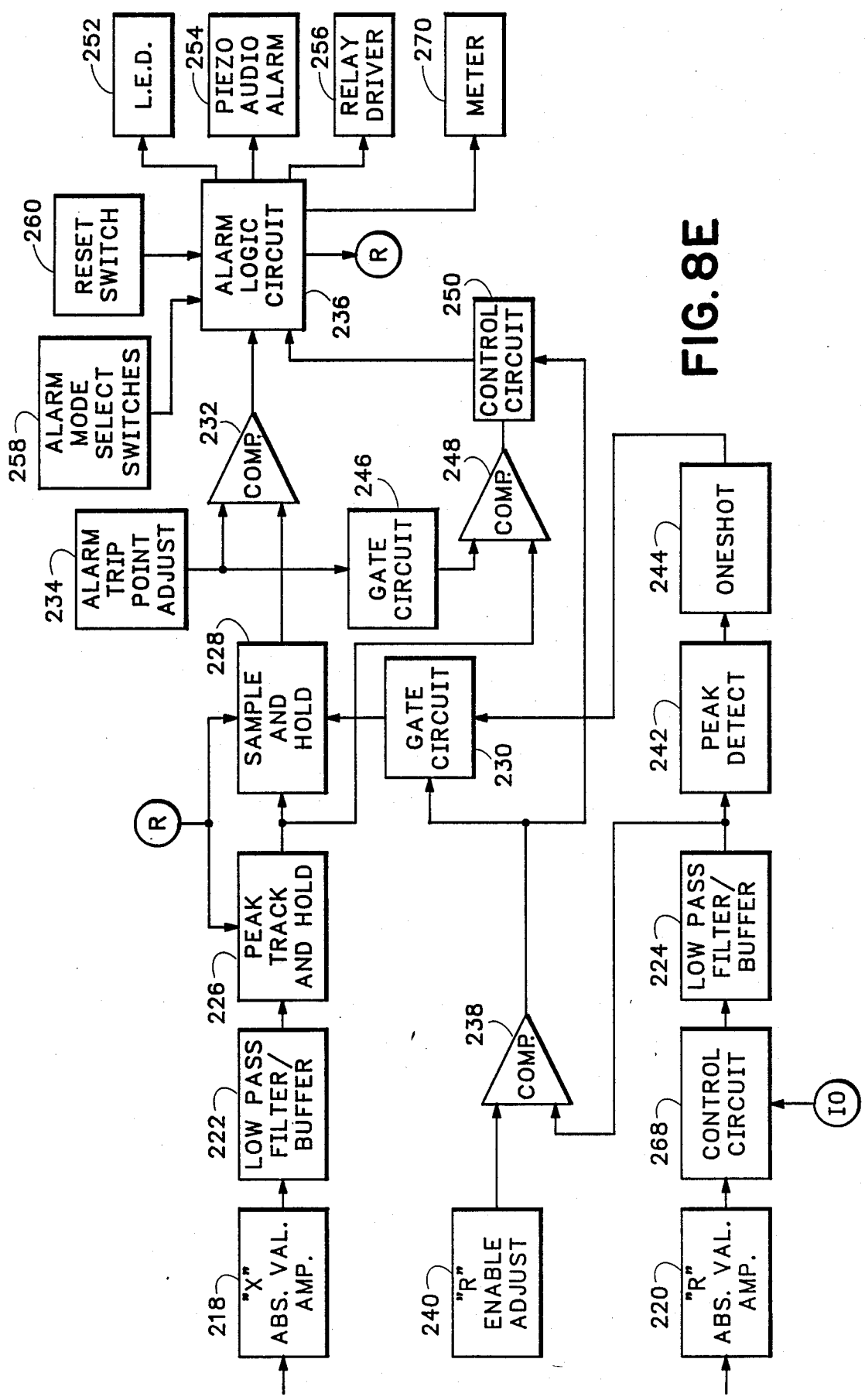

The outputs of the "X" and "R" sixth-order low-pass filters 214 and 216 are connected to of "X" and "R" absolute value amplifiers, respectively, shown in FIG. 8E. The described geometries of the transmit coil array 30 and the receive coil array 32 result in three lobes of sensitivity which yield different polarity composite receive signals depending on the direction the metal is moving within the passageway 14. To simplify the downstream target detection circuitry, the absolute value amplifiers 218 and 220 ensure the signals at their output terminals have only one polarity. The output terminals of the "X" and "R" absolute value amplifiers 218 and 220 are connected to the input terminals of the "X" and "R" low-pass filter and buffer circuits 222 and 224, respectively. The output signals of the "X" and "R" low-pass filter and buffer circuits 222 and 224 are hereinafter called the "X" and "R" channel signals, respectively. Between the "R" absolute value amplifier 220 and the "R" low-pass buffer and amplifier circuit 224 is a control circuit 268 which receives the control signal from the inhibit circuit 206 (FIG. 8D). In response to a control signal, the control circuit prevents the "R" low-pass filter and buffer circuit from receiving the signal output from the "R" absolute value amplifier 220, preventing detection of targets when the phase-lock loop 116 is out of lock, or when an object is detected in the array avoidance cute 16, or when the metal detector 10 is reset, as described later.

Before describing the balance of the circuitry, a description of typical signals is in order. When metal passes through the passageway 14, eddy currents are induced in the metal, causing a magnetic field which induces a periodic signal component at the terminals 33 of the receive coil array 32. This periodic signal component is at the same frequency and in quadrature with the signal supplied to the terminals 31 of the transmit coil array 30 and thus causes a DC signal at the output terminal of the "X" demodulator 158, which in turn produces an "X" channel signal at the output of the "X" low-pass filter 222. Metal passing through the passageway 14 also causes permeability changes which induces another periodic signal component at the terminals 33 of the receive coil array 32. This second periodic signal component is both at the same frequency and in phase with the signal at the terminals 31. Thus, this second signal component results in a DC signal at the output of the "R" demodulator 160, thus producing in an "R"

channel signal at the output of the "R" low-pass filter 224.

Generally, a small metallic object causes both "R" and "X" channel signals, with the proportions of the "X" and "R" channel signals dependant on the objects composition. Unfortunately, a person walking through the passageway 14 also causes an "R" channel signal typically two or three orders of magnitude larger than the signal caused by the small metallic object, thus making the "R" channel signal alone useless for detecting small metallic objects. Fortunately, although a small metallic object causes a weak "X" channel signal, a person walking through the passageway causes virtually none. The metal detector uses two detection schemes simultaneously which take advantage of this. Both schemes watch for an "X" channel signal only if the "R" channel signal has reached a predetermined threshold. The "small target" detection circuitry samples the "X" channel signal when the "R" channel signal reaches a maximum which is over the predetermined threshold, and activates an alarm if the sampled "X" channel signal is greater than a user-selectable trip point value. The "large target" detection circuitry activates another alarm if both the "X" channel signal is a predetermined amount greater than the user-selectable trip point value and the "R" channel signal has reached the predetermined threshold.

Returning to the discussion of FIG. 8E, a peak track and hold circuit 226 is connected to receive the output of the "X" low-pass filter and buffer circuit 222. The peak track and hold circuit is essentially a fast attack, slow decay circuit, tracking signal rises and letting the peaks decay in about one-half second.

A sample and hold circuit 228, connected to receive the output of the peak track and hold circuit 226, samples its input signal whenever it receives a command from a gate circuit 230, holds the value, and provides the held signal at its output terminal. As previously mentioned, and discussed in more detail below, the sample and hold circuit is commanded to sample during a 20 millisecond interval when the "R" channel signal has peaked and is greater than a predetermined value. The sample and hold circuit's output signal may also be reset to zero upon command from the alarm logic circuit 236.

The output terminal of the sample and hold circuit 228 is connected as one input to a small target comparator 232. The comparator's other input is the output of an alarm trip point adjust circuit 234 which provides a "user-selectable reference signal." Whenever the output signal from the sample and hold circuit 228 is greater than the user selectable reference signal from the alarm trip point adjust circuit 234, the small target comparator provides a "small target" signal to the alarm logic circuit 236. The operator may adjust the user-selectable reference signal to adjust the sensitivity of the detector 10.

Another comparator 238 is connected to receive as one input the "R" channel signal output of the "R" low-pass filter and buffer circuit 224. The comparator's other input is connected to the output of an "R" enable adjust circuit 240, which provides a predetermined reference signal. Whenever the "R" channel signal is greater than the output of the "R" enable adjust circuit 240, signifying that a person is walking through the passageway 14, the comparator 238 supplies a control signal to both the gate circuit 230 and a control circuit 250, to be discussed later.

Also connected to the output terminal of the "R" low-pass filter and buffer circuit 224 and receiving the "R" channel signal therefrom is a peak detect circuit 242 which supplies a pulse signal at its output terminal whenever the "R" channel signal reaches a maximum. A one-shot circuit 244, connected to the output of the peak detect circuit 242, receives the pulse signal and, in response thereto, supplies at its output terminal another pulse signal of approximately 20 millisecond width which is connected to another input terminal of the gate circuit 230. Whenever the gate circuit 230 receives both the control signal from the comparator 238 and the pulse signal from the one-shot circuit, it commands the sample and hold circuit 228 to sample and hold. This will occur when a person is centered within the passageway, and is when the detector is most sensitive. By narrowing the time window during which the detector looks for metal, false alarms from external electrical and mechanical interference are minimized.

If the sample and hold circuit 228 becomes overloaded, and its output becomes unpredictable. Thus it is possible for the small target comparator 232 to not detect a large amount of metal moving through the passageway. Thus, also connected to the alarm trip point adjust circuit 234 to receive the selectable reference signal therefrom is an offset circuit 246. The output signal of the offset circuit which is merely the selectable reference signal plus a predetermined offset voltage, is provided as an input to large target comparator 248 whose other input receives the output of the peak track and hold circuit 226. Whenever the output of the latter circuit is larger than the output of the offset circuit 246, the comparator 248 provides a "large target" signal at its output. This output is connected an another input to the alarm logic circuit 236 via a control circuit 250. The control circuit 250 receive the control signal from the comparator 238 and allows the large target signal to reach the alarm logic circuit only if the comparator 238 signals that a person is in the passageway 14.

The alarm logic circuit 236 receives the small target and large target signals from the comparator 232 and the control circuit 250, respectively. In response, the alarm logic circuit 236 activates light emitting diodes (LEDs) on the terminal 34. The alarm logic circuit 236, depending on the alarm mode set by alarm mode switches 258 on the terminal 34, may also sound a audio alarm 254 in response to the only the small target signal, only the large target signal, or either the small or large target signals. The alarm logic circuit 236 also activates a relay driver circuit 256, allowing other alarm devices to be added to the detector 10 for actuation therewith.

The alarm logic circuit 236 routes either the small or large target signal to a meter 270 on the terminal 34. If a large target signal is received by the logic circuit, it will be the signal routed to the meter; otherwise the small target signal is routed.

In an automatic reset mode, the alarm logic circuit sends a reset signal to the peak track and hold circuit 226 and the sample and hold circuit 228 in response to receiving either a small target or large target signal. This automatic reset signal is sent after the alarm tone finishes and a predetermined delay. The alarm logic circuit 236 may also receive a signal from a reset switch 260 on the terminal 34. In response, the alarm logic circuit 236 sends a reset signal. In the manual reset mode, no reset signal will be sent until the reset switch is pressed, thus retaining the meter display and LED status after an alarm condition.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A walk-through metal detector, comprising:
   (a) transmit coil means for generating an electromagnetic field;
   (b) receive coil means for sensing changes in said electromagnetic field, and generating an output signal representative of said changes;
   (c) circuit means for selectively processing said output signal to detect the presence of metal within said electromagnetic field;
   (d) coil support means for supporting said transmit and receive coil means, said coil support means having an aperture therethrough of size sufficient to enable a person to walk therethrough; and
   (e) outer shell means surrounding said coil support means for protecting said coil support means from physical contact, said outer shell means being spaced apart from said coil support means and mechanically decoupled therefrom.

2. The walk-through metal detector of claim 1, further comprising a passageway, extending from the entry to the exit sides of said detector, projecting through said aperture and spaced apart from and inside said electromagnetic field of said transmit coil means, said passageway being supported by said outer shell means.

3. The walk-through metal detector of claim 1, wherein said coil support means has a resonant frequency which is greater than the frequency of said output signal generated in response to sensing the presence of metal carried on a person walking through said detector.

4. The walk-through metal detector of claim 1, said detector having an entry side and an exit side, and further comprising a chute means for transporting objects by gravity action from the entry to the exit side of said detector, said chute means being supported by said outer shell means.

5. The walk-through metal detector of claim 4 further comprising an object detector means for sensing when an object is placed on said chute means and responsively causing said circuit means to ignore any metal that may be contained in the object.

6. A walk-through metal detector, comprising:
   (a) transmit coil means for generating an electromagnetic field;
   (b) receive coil means for sensing changes in said electromagnetic field, and generating an output signal representative of said changes;
   (c) circuit means for selectively processing said output signal to detect the presence of metal within said electromagnetic field;
   (d) "X" demodulator means responsive to said output signal and producing an "X" channel signal corresponding to the level of signal components in said output signal caused by permeability changes within said electromagnetic field;
   (e) "R" demodulator means responsive to said output signal and producing an "R" channel signal corresponding to the level of signal components in said output signal caused by induced eddy currents within said electromagnetic field;
   (f) first high-pass filter means for filtering low frequency signal components from said "X" channel signal to result in a first "X" filtered signal;
   (g) second high-pass filter means for filtering low frequency signal components from said "R" channel signal to result in a first "R" filtered signal;
   (h) first logarithmic amplifier means for producing an "X" logarithmic signal corresponding to a logarithm of said first "X" filtered signal;
   (i) second logarithmic amplifier means for producing an "R" logarithmic signal corresponding to a logarithm of said first "R" filtered signal;
   (j) noise adder means, adding a periodic signal to said first and second logarithmic amplifier means, for increasing the signal-to-noise ration of said first and second amplifier means;
   (k) first low-pass filter means for filtering from said "X" logarithmic signal those frequency components greater than those caused by metal being carried by a person walking through said aperture, resulting in a second "X" filtered signal;
   (l) second low-pass filter means for filtering from said "R" logarithmic signal those frequency components greater than those caused by metal being carried by a person walking through said aperture, resulting in a second "R" filtered signal;
   (m) first absolute value amplifier for producing an "X" final signal having one polarity and corresponding to said second "X" filtered signal;
   (n) second absolute value amplifier for producing an "R" final signal having one polarity and corresponding to said second "R" filtered signal;
   (o) small target detection means for generating a small target signal when said "X" final signal is greater than a first predetermined trip point value and said "R" final signal is both greater than a second predetermined trip point value and is at a maximum;
   (p) large target detection means for generating a large target signal when said "X" final signal is greater than a third predetermined trip point value and said "R" final signal is greater than said second predetermined trip point value;
   (q) alarm means for generating a perceptible alarm signal in response to receiving said small target signal; and
   (r) alarm means for generating a perceptible alarm signal in response to receiving said large target signal.

7. A walk-through metal detector, comprising:
   (a) transmit coil means for generating an electromagnetic field;
   (b) receive coil means for sensing changes in said electromagnetic field, and generating an output signal representative of said changes;
   (c) circuit means for selectively processing said output signal to detect the presence of metal within said electromagnetic field;
   (d) means for altering the size of the effective portion of said electromagnetic field between a first size and a second size; and
   (e) selection means for selecting between said first and said second sizes of said effective portion of said electromagnetic field.

8. The walk-through metal detector of claim 7, wherein said transmit coil means comprises at least two alternatively selectable transmit coils having different respective configurations, and wherein said receive coil means comprises at least two alternatively selectable balanced receive coil arrays, said receive coil arrays having respective different configurations corresponding to said different respective configurations of said transmit coils, and wherein said means for altering includes means for selecting a selected one of said transmit coils and means for selecting one of said receive coil arrays corresponding to said selected one of said transmit coils.

9. The walk-through metal detector of claim 8, wherein one of said transmit coils has a first transmit segment and a second transmit segment, where said first transmit segment generates a magnetic field which substantially cancels a magnetic field generated by said second transmit segment.

10. The walk-through metal detector of claim 8, wherein one of said receive coil arrays has a first receive segment and a second receive segment, where said first receive segment produces, in response to a change in said magnetic field, a voltage which substantially cancels a voltage produced by said second receive segment in response to said change in said magnetic field.

11. The walk-through metal detector of claim 7, said detector having an aperture adapted to allow a body to pass therethrough, wherein said first and second sizes of said effective portion of said electromagnetic field define different vertical portions of said aperture.

12. A walk-through metal detector, comprising:
(a) transmit coil means for generating an electromagnetic field;
(b) receive coil means for sensing changes in said electromagnetic field, and generating an output signal representative of said changes;
(c) circuit means for selectively processing said output signal to detect the presence of metal within said electromagnetic field; and
(d) coil support means for supporting said transmit and receive coil means, said coil support means having an aperture therethrough of size sufficient to enable a person to walk therethrough, said coil support means having a resonant frequency which is greater than the frequency of said output signal generated in response to sensing the presence of metal carried on a person walking through said detector.

* * * * *

UNITED STATES PATENT AND TRADEMARK OFFICE
CERTIFICATE OF CORRECTION

PATENT NO. : 4,906,973  Page 1 of 2
DATED : March 6, 1990
INVENTOR(S) : James P. Karbowski, Mark W. Rohde It is certified that error appears in the above-identified patent and that said Letters Patent is hereby corrected as shown below:

| | | |
|---|---|---|
| Col. 1, | Line 41: | Change "a" to --an--; |
| Col. 1, | Line 46: | Change "a" to --an--. |
| Col. 2, | Line 25: | Change "It walk-through" to --It is another object to provide a walk-through--; |
| Col. 2, | Line 28-29: | Change "insensitive to target" to --insensitivity to target; |
| Col. 2, | Line 52: | Change "FIG. 3 is sectional" to --FIG. 3 is a sectional-- |
| Col. 3, | Line 54: | Change "directly causing contacting" to --directly contacting--. |
| Col. 7, | Line 2: | Change "to a the transmit" to --to the transmit-- |
| Col. 8, | Line 44: | Change "comparator 180, and" to --comparator 180, an-- |
| Col. 10, | Line 2: | Change "receive infrared" to --receiving infrared-- |
| Col. 10, | Line 22: | Change "connected to of" to --connected to-- |

UNITED STATES PATENT AND TRADEMARK OFFICE
CERTIFICATE OF CORRECTION

PATENT NO.   : 4,906,973
DATED        : March 6, 1990
INVENTOR(S)  : James P. Karbowski, Mark W. Rohde It is certified that error appears in the above-identified patent and that said Letters Patent is hereby corrected as shown below:

Col. 10,   Line 48:   Change "array avoidance cute" to --array avoidance chute--

Col. 12,   Line 34:   Change "connected an another" to --connected another--

Col. 12,   Line 36:   Change "circuit 250 receive" to --circuit 250 receives--

Col. 12,   Line 46:   Change "sound a audio" to --sound an audio--

Col. 12,   Line 47:   Change "to the only the" to --to only the--

Signed and Sealed this

Third Day of March, 1992

Attest:

HARRY F. MANBECK, JR.

*Attesting Officer*     *Commissioner of Patents and Trademarks*